3,322,754
13 - ALKYL - GONA - 4,8(14),9(10) TRIEN-3-ONE-17α HALOGENATED HYDROCARBON 17β-ETHERS
Thomas B. Windholz, Westfield, and Arthur A. Patchett, Cranford, N.J., and John Fried, Palo Alto, Calif., assignors to Merck & Co., Inc., Rahway, N.J., a corporation of New Jersey
No Drawing. Filed Oct. 18, 1965, Ser. No. 497,480
23 Claims. (Cl. 260—239.5)

This invention is concerned with novel steroid compounds and to processes of preparing the same. More particularly, it relates to novel gona-4,8(14),9-triene-3,17-diones, to novel 17-hydroxygona-4,8(14),9-trien-3-ones, the 17β-ethers thereof such as the 17β-alkyl, 17β-cyclo-alkyl, 17β-aralkyl ethers, 17β unsaturated hydrocarbon ethers and 17β-substituted amino alkyl ethers, and the 17β-acyl esters thereof such as 17β-alkanoyl esters and 17β-alkanoyl esters and 17β-alkyl carbonates.

This is a continuation-in-part of Ser. No. 227,582, filed Apr. 1, 1962, now Patent No. 3,242,197.

The preferred gona-4,8(14),9-triene-3,17-diones which are the subject of this invention may be chemically represented by the following formula:

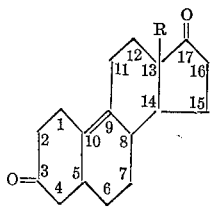

wherein R is a member selected from the group consisting of hydrogen and halogen atoms and lower alkyl, allyl, trifluoromethyl, —CN, —COOR''', —CH$_2$X and —CHX$_2$, radicals, in which R''' is a lower alkyl radical and X is a member selected from the group consisting of halo, —COOR''', —OR''' and —CN radicals (R''' again being a lower alkyl radical). These novel steroids may be denoted as 13-R-gona-4,8(14),9-triene-3,17-diones.

The preferred 17-hydroxygona-4,8(14),9-trien-3-ones which are the subject of this invention may be chemically represented by the following formula:

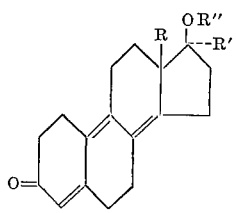

wherein R is as previously described, R' is a member selected from the group consisting of a hydrogen atom and lower alkyl, allyl, methallyl, vinyl, ethynyl, haloethynyl, trifluorovinyl, trifluoromethylethynyl, trifluoromethylvinyl radicals, and R'' is a member selected from the group consisting of a hydrogen atom, an alkanoyl radical, an alkoxy carbonyl radical, and a hydrocarbon radical, such as an alkyl radical, an aralkyl radical, or a cycloalkyl radical, containing from 1-6 carbon atoms, an unsaturated aliphatic radical, and a substituted amino alkyl radical. These novel steroids may be denoted as 13-R-17α-R'-17β-OR''-gona-4,8(14),9-trien-3-ones.

The subject 13 - R - gona - 4,8(14),9 - triene - 3,17-dione compounds are useful synthetic compounds since they may be used to prepare the corresponding 13-R-17α-R'-17β-hydroxygona-4,8(14),9-trien-3-one compound, the 17β-alkanoyl esters and the 17β-substituted amino alkyl ethers, the 17β-alkyl ethers, the 17β-aralkyl ethers, and the 17β-cycloalkyl ethers thereof, containing from 1–6 carbon atoms, which possess useful properties as orally and parenterally active progestational agents, which also have the property of inhibiting gonadotrophin secretion. The compounds are useful in the treatment of various human ailments requiring progestational hormone therapy as well as in the synchronization of the estrus in domestic animals.

According to the process of this invention, the starting material utilized in the preparation of the subject gona-4,8(14),9-triene-3,17-diones is 6-oxo-1-vinyl-2,3,4,6,7,8-hexahydronaphthalene, which may be represented by the following structural formula:

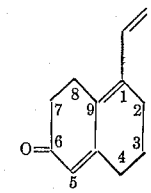

A method of preparing this starting material is more fully described in Example 1.

It has been found that 6-oxo-1-vinyl-2,3,4,6,7,8-hexahydronaphthalene will react with cyclopentane-1,3-diones to form the corresponding gona-4,8(14),9-triene-3,17-diones of this invention. The preferred cyclopentane-1,3-diones that are operable herein may be denoted as 2-R-cyclopentane-1,3-dione and may be chemically represented as follows:

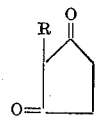

wherein R is a member selected from the group consisting of hydrogen and halogen atoms and lower alkyl, allyl, —CF$_3$, —COOR''', —CH$_2$X and —CHX$_2$ radicals, in which R''' is an alkyl radical and X is a member selected from the group consisting of halo, —COOR''', —OR''' and —CN radicals. The interaction of 6-oxo-1-vinyl-2,3,4,6,7,8-hexahydronaphthalene and said cyclopentane-1,3-diones may be chemically illustrated by the following equation:

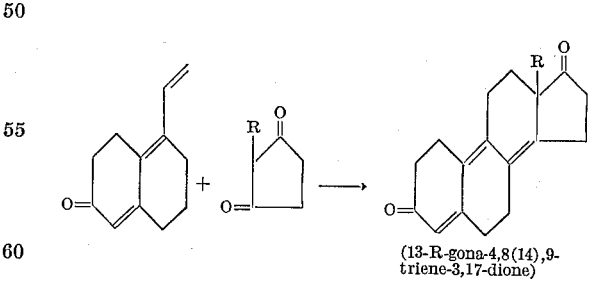

(13-R-gona-4,8(14),9-triene-3,17-dione)

In a preferred embodiment of this invention, the subject 13-R-gona-4,8(14),9-triene-3,17-diones are prepared by dissolving 6-oxo-1-vinyl-2,3,4,6,7,8-hexahydronaphthalene in an inert organic solvent containing a catalytic amount of a dialkylamine, adding the desired 2-R-cyclopentane-1,3-dione thereto and heating the mixture, preferably under reflux conditions, until the reaction is complete. The resulting 13-R-gona-4,8-(14),9-triene-3,17-dione may then be recovered by conventional laboratory techniques and converted into the corresponding 13-R-

17α - R' - 17β - hydroxygona - 4,8(14),9 - trien - 3 - one compounds of this invention, the 17β-alkyl ethers, 17β-cycloalkyl ethers, the 17β-aralkyl ethers and the 17β-alkanoyl esters thereof. The organic solvent should preferably be one having a boiling point over 70° C. Among the organic solvents that are operable herein are aromatic hydrocarbons such as, for example, benzene, toluene xylene, and the like, and aliphatic alcohols such as, for example, tert-butanol, sec-pentanol and the like, as well as mixtures of said aromatic hydrocarbons and said aliphatic alcohols. Among the dialkylamine catalysts that are operable herein are, preferably, the lower dialkylamines such as, for example, dimethylamine, diethylamine, methylethylamine, and the like.

It has been found that ketone reactive addition substances will react with the 17-keto group of the 13-R-gona-4,8(14),9-triene-3,17-dione steroids of this invention without substantially reacting with the 3-keto group therein to give a product with a 17β-hydroxyl group and a 17α-oriented addition group (R'), thereby forming the 13 - R - 17α - R' - 17β - hydroxygona - 4,8(14),9 - trien-3-one steroids of this invention.

Addition reactions involving the carbonyl group (>C=O) are reported in the literature. Most of these reactions are the result of nucleophilic attack on the carbonyl-carbon atom. Since the electrons of the carbonyl double bond hold together atoms of quite different electronegativity, the electrons are not equally shared. In particular, the electrons are pulled strongly toward the electronegative oxygen atom, the polarity of the carbonyl group being represented as follows:

$$\overset{\delta^+}{\underset{/}{\diagdown}}C=O^{\delta^-}$$

As a result, the carbonyl carbon is electron deficient and therefore highly vulnerable to nucleophilic attack. Whatever the mechanism involved, however, addition of an unsymmetrical reagent is oriented so that the nucleophilic (basic) portion attaches itself to the carbonyl carbon atom and the electrophilic (acidic) portion attaches itself to the carbonyl-oxygen atom.

For example, in a Grignard reagent (which may be generally designated as RMgX, wherein R is an organo group and X is a halide), the carbon-magnesium bond is a highly polar bond, carbon being negative relative to electropositive magnesium. In the addition to carbonyl compounds, therefore, the organic carbanion (R⁻) becomes attached to the carbonyl-carbon atom and the electrophilic magnesium to the carbonyl-oxygen atom.

Accordingly, the 17-keto group of the instant 13-R-gona-4,8(14),9-trien-3,17-diones has been found to undergo addition of Grignard reagents wherein the organo group is selected from the class consisting of lower alkyl, allyl, methallyl, ethynyl, vinyl, trifluoromethylvinyl and trifluoromethylethynyl and trifluorovinyl radicals, said organo group adding onto the 17-carbon atom. The magnesium salt of the weakly acidic alcohol that is thus produced is easily converted into the 17β-alcohol by the addition of a proton donating substance, such as, for example, the stronger acid, water.

Similar nucleophilic additions have been found to occur between reagents such as alkali metal acetylides, alkali metal haloacetylides and organolithium compounds, such as, for example, sodium acetylide, potassium acetylide, sodium chloroacetylide, potassium chloroacetylide, methyllithium, ethyllithium and the like, and the 17-keto group of the 13-R-gona-4,8(14),9-triene-3,17-diones of this invention. The nucleophilic acetylide, haloacetylide or organo group attacks the carbonyl-carbon atom and the metal adds onto the carbonyl-oxygen atom to form the corresponding salt which is in turn converted into the 17β-hydroxy compound in the presence of a proton donator.

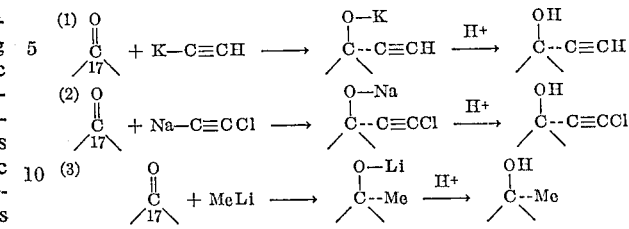

It has also been found that the instant 13-R-gona-4,8(14),9-triene-3,17-diones will undergo reduction of the 17-keto group by means of a hydride-transfer reagent such as, for example, a metal hydride (e.g., sodium borohydride and lithium aluminum hydride). The important step in such reductions is the transfer of a hydrogen, together with its pair of electrons, that is, a "hydride transfer," from the reducing agent to the carbon atom of the carbonyl group, thereby converting the carbonyl compound to a salt which may then be converted to the corresponding 17β-hydroxy compound by means of a proton donator.

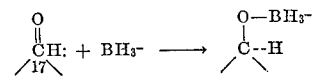

Such hydride-transfer reductions are, in effect, addition reactions to the carbonyl group in which the nucleophilic hydride (H:) attacks the carbonyl-carbon atom and the remaining electrophilic portion adds onto the carbonyl-oxygen atom.

The foregoing reaction mechanisms are preferred as an explanation of the addition reactions occurring in the conversion of the subject gona-4,8(14),9-triene-3,17-diones to the corresponding 17α-R'-17β-hydroxygona-4,8(14),9-trien-3-ones, although the invention is not meant to be strictly limited to any theory of action.

The solvents utilized in the foregoing addition reactions are, generally, inert organic solvents that are well known for each type of ketone additive employed. For example, with the Grignard, organolithium and acetylide types of addition reagents, such solvents as tetrahydrofuran, alkyl ethers (e.g., dimethyl ether, methyl ethyl ether, diethyl ether and the like), and the aromatic hydrocarbons (e.g., benzene, toluene, xylene and the like) are preferred. In hydride transfer reactions, the lower alkanols such as methanol, ethanol, and the like are preferred. The solvent should obviously be void of any reactive unsaturated linkages capable of undergoing addition with the ketone additives utilized herein.

In general terms, therefore, the instant 13-R-gona-4,8(14),9-triene-3,17-diones are reacted in an inert organic solvent with a ketone reactive addition substance capable of providing a nucleophilic R' group for addition onto the carbon atom of the 17-keto group and an electrophilic portion for addition onto the oxygen atom of the 17-keto group, said R' being a hydrogen atom or a lower alkyl, allyl, methallyl, vinyl, ethynyl, haloethynyl, trifluoromethylvinyl and trifluoro-methyl ethynyl and trifluorovinyl radical; the resulting salt is converted to the corresponding 17β-hydroxy compound by providing a source of protons to react with said salt, thereby forming the 13-R-17α-R'-17β-hydroxygona-4,8(14),9-trien-3-ones of this invention.

The reason for the selectivity of the ketone reactive addition substance for the 17-ketone site is not definitely known but is believed to be due to the more reactive nature of the 17-keto double bond in contrast with that of the 3-keto double bond, the stability of the latter probably being caused by the extended conjugated system of four double bonds that is present in the subject 13-R- gona-4,8(14), 9-triene-3,17-diones and which may be represented as follows:

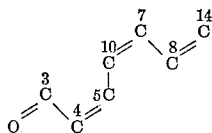

To enhance said selectivity, however, the temperature at which the ketone reactive addition substance is reacted with the 13-R-gona-4,8(14),9-triene-3,17-diones is preferably below 30° C. and, more preferably, in the range of from −30° C. to 10° C., although temperatures as low as −70° C. may be used.

The 13-R-17α-R'-17β-hydroxygona-4,8(14),9-triene-3-ones of this invention are readily converted into the corresponding 17β-alkanoyl ester by reaction with an alkanoic acid anhydride or alkanoyl halide in the presence of a tertiary amine such as pyridine. The acid anhydrides which may be used for this purpose include acetic anhydride, propionic acid anhydride, butyric acid anhydride and the like. The 17β-caproate is prepared by the reaction of the respective 17-hydroxygona-compound with caproyl halide in the presence of a tertiary amine base.

The 13-R-17α-R'-17β-hydroxygona-4,8(14),9-triene-3-ones of this invention are readily converted into the corresponding 17β-aralkyl, 17β-alkyl ethers, 17β-cycloalkyl ethers, 17β-unsaturated aliphatic ethers and 17β- substituted amino alkyl ethers by reaction when an aralkyl, an alkyl, a cycloalkyl, or unsaturated aliphatic or a substituted amino alkyl halide or sulfate and a base.

Compounds useful in the presently preferred process for preparing novel 17β-ethers of this invention include 13-methyl-17α-trifluoromethylethynyl-17β-hydroxy-gona-4,8(14),9-triene-3-one,
13-methyl-17α-trifluoromethylvinyl-17β-hydroxygona-4,8(14),9-triene-3-one,
13-methyl-17α-chloroethynyl-17β-hydroxygona-4,8(14),9-triene-3-one,
13-methyl-17α-bromoethynyl-17β-hydroxygona-4,8(14),9-triene-3-one,
13-methyl-17α-trifluorovinyl-17β-hydroxygona-4,8(14),9-triene-3-one,
13-ethyl-17α-trifluoromethylethynyl-17β-hydroxygona-4,8(14),9-triene-3-one,
13-ethyl-17α-trifluoromethylvinyl-17β-hydroxygona-4,8(14),9-triene-3-ones,
13-butyl-17α-trifluoromethylvinyl-17β-hydroxygona-4,8(14),9-triene-3-one,
13-butyl-17α-chloroethynyl-17β-hydroxygona-4,8(14),9-triene-3-one,
13-butyl-17α-bromoethynyl-17β-hydroxygona-4,8(14),9-triene-3-one,
13-butyl-17α-trifluorovinyl-17β-hydroxygona-4,8(14),9-triene-3-one,
13-cyclohexyl-17α-trifluoromethylvinyl-gona-4,9,8(14)-triene-3-one,
13-cyclohexyl-17α-trifluoromethylvinyl-gona-4,9,8(14)-trien-3-one,
13-cyclohexyl-17α-chloroethynyl-gona-4,9,8(14)-trien-3-one,
13-cyclohexyl-17α-bromoethynyl-gona-4,9,8(14)-trien-3-one,
13-cyclohexyl-17α-trifluorovinyl-gona-4,9,8(14)-trien-3-one.

In one modification of this process the 17β-hydroxy compound is reacted with an halide and silver oxide in a solvent such as a dialkyl alkanoylamide such as dimethyl formamide and the like to form the corresponding 17β-ether. The alkyl halides which may be used for this purpose include methyl iodide, ethyl iodide, and propyl iodide, isopropyl iodide, butyl iodide, isobutyl iodide, amyl iodide, isoamyl iodide, hexyl iodide and the corresponding alkyl bromides. Also suitable are the cyclo alkyl halides huch as cyclopentyl iodide, cyclohexyl iodide, cyclopentyl bromide and cyclohexyl bromide. The unsaturated aliphatic halides such as allyl bromide and cyclohexenyl iodide as well as the substituted amino alkyl halides such as diethyl amino ethyl bromide, and pyrrolidyl bromide and morpholino propyl bromide may also be used.

The steroid alcohol, for example 13-methyl 17α-chloroethynyl-17β-hydroxygona-4,8(14),9-trien-3-one is mixed with the solvent, for example dimethyl formamide in the presence of the halide such as ethyl iodide, and silver oxide is added. The mixture is stirred at from about 10° to about 80° C. for from 2 to 6 days, from 15°-30° C. for 4 days being preferred, a small amount of silver oxide being added each day. The product is then isolated. In one mode of isolation a reaction inert, water immiscible solvent, for example a halogenated hydrocarbon solvent suitably chloroform is added to the reaction mixture which is then stirred and filtered. The solvent is removed from the filtrate preferably by evaporation under reduced pressure and the residue chromatographed.

Alternatively the 17β-hydroxy steroid may be taken up in a reaction inert organic solvent, such as an aromatic hydrocarbon solvent, for example, benzene or toluene, and treated with an aliphatic halide, any of the aralkyl, alkyl, cycloalkyl, unsaturated aliphatic and substituted amino alkyl halides listed in the above-mentioned modification of the process being suitable, in the presence of an alkali metal hydride such as sodium or potassium hydride to produce the 17β-ether.

The steroid alcohol, for example, 13-ethyl-17α-trifluorovinyl-17β-hydroxygona-4,8(14),9-trien-3-one is dissolved in a reaction inert organic solvent, for example, benzene and the aliphatic halide in a similar solvent, for example cyclopentyl iodide in benzene is added. A small excess of halide is used, an excess of from about 5% to about 10% being preferred. The alkali metal hydride, suitably sodium hydride is then suspended in the same solvent and added to the mixture. The mixture is then agitated for from about 1 to about 36 hours at a temperature of from about 10° to 80° C., agitation for 18 hours at from 15° C. to about 30° C. being preferred. The product is then isolated. In one suitable method of isolation, water is added to the mixture to destroy any remaining alkali metal hydride and the mixture extracted with a reaction inert water immiscible solvent such as benzene or ether. The organic extract is then dried over a suitable drying agent, such as potassium carbonate and filtered. The solvent is then removed, suitably by evaporation under reduced pressure and the residue further purified by chromatography.

In yet another modification of the process, the 17β-hydroxy steroid is reacted with an aryl or alkyl alkali metal salt such as methyl lithium, butyl lithium or phenyl lithium to produce a corresponding 17β-oxy lithium salt which is then treated with an alkyl, aralkyl or cycloalkyl halide, any of the halides utilized in the previous modification of this process being suitable to produce the desired 17β-aralkoxy, 17β-alkoxy or 17β-cycloalkoxy steroid.

The steroid alcohol, for example 17β-hydroxy-17α-bromoethynyl-gona-4,9,8(14)-trien-3-one is taken up in an ether, diethyl ether or tetrahydrofuran being preferred. A solution of an aryl or alkyl alkali metal salt suitably phenyl lithium or butyl lithium in ether or tetrahydrofuran is then added. The mixture is then agitated for from about 1 to about 4 hours at from about 10° to about 30° C. in an inert atmosphere, a nitrogen atmosphere being preferred. A solution of the aralkyl, alkyl or cycloalkyl halide in a similar solvent, for example ether or tetrahydrofuran is then added and the mixture agitated at from about 10° to about 80° C. for a further period of from about 10 to about 24 hours, agitation at about 15° C. to 30° C. for about 18 hours being especially preferred. The product is then isolated, suitably a saturated brine solution is added to the mixture and the mixture extracted with a water immiscible solvent such as benzene or ether. The organic extract is then dried over a suitable drying agent such as sodium sulfate, filtered and the solvent removed, preferably by evaporation under reduced pressure. The residue is then further purified by chromatography.

In another modification of the process the 17β-hydroxy steroid, for example 13-cyclohexyl-17α-trifluoromethyl-ethynyl-17β-hydroxygona-4,9,8,(14)-trien-3-one is treated with a dialkyl sulfate in an aqueous alkaline medium to produce the corresponding 17β-alkoxy compounds. The diaralkyl, dialkyl and dicycloalkyl sulfates which may be used in this modification includes dimethyl sulfate, diethyl sulfate, dipropyl sulfate, diisopropyl sulfate, dibutyl sulfate, diisobutyl sulfate, diamyl sulfate, diisoamyl sulfate, dihexyl sulfate, dibenzyl sulfate and the like. Also suitable are the cycloalkyl sulfates such as dicyclopentyl sulfate, dicyclohexyl sulfate, and the like. Sodium or potassium-hydroxide in aqueous solution are preferred as the alkaline medium.

The steroid alcohol for example, 13-cyclohexyl 17α-trifluoromethylethynyl-17β - hydroxygona - 4,8(14),9 - trien-3-one is taken up in a reaction inert solvent such as benzene, toluene, ether or tetrahydrofuran and added to a mixture of the dialkyl sulfate in the aqueous alkaline medium. It is preferred to use a small excess of the dialkyl sulfate, an excess of about 5 to about 20% being suitable. The mixture is then allowed to stand for from 1 to 24 hours at a temperature of from about 10° to about 80° C., however it is preferred to let the mixture stand for about 18 hours at from about 15° C. to about 30° C. Where the solvent utilized is substantially immiscible with the aqueous medium it is preferred to agitate the mixture during the reaction time. The product is then isolated. In one method of isolation the mixture is extracted with a reaction inert water immiscible solvent such as benzene or toluene. The extract is then dried over a drying agent for example over potassium carbonate, filtered and the solvent removed, suitably by evaporation under reduced pressure. The residue is then further purified by chromatography.

The useful and novel 17β-steroid ethers within the scope of this invention include 13-methyl-17α-trifluoromethylethynyl-gona-4,8(14),9-trien-3-one-17β-methyl ether,
13-methyl-17α-trifluoromethylvinyl-gona-4,8(14),9-trien-3-one-17β-methyl ether,
13-methyl-17α-chloroethynyl-gona-4,8(14),9-trien-3-one-17α-methyl ether,
13-methyl-17α-bromoethynyl-gona-4,8(14),9-trien-3-one-17β-methyl ether,
13-methyl-17α-trifluorovinyl-gona-4,8(14),9-trien-3-one-17β-methyl ether,
13-ethyl-17α-trifluoromethylethynyl-gona-4,8(14),9-trien-3-one-17β-n-propyl ether,
13-ethyl-17α-trifluoromethylvinyl-gona-4,8(14),9-trien-3-one-17β-n-propyl ether,
13-ethyl-17α-chloroethynyl-gona-4,8(14),9-trien-3-one-17β-n-propyl ether,
13-ethyl-17α-bromoethynyl-gona-4,8(14),9-trien-3-one-17β-trifluorovinyl-gona-4,8(14),9-trien-3-one-17β-n-propyl ether,
13-butyl-17α-trifluoromethylethynyl-gona-4,8(14),9-trien-3-one-17β-cyclohexyl ether,
13-butyl-17α-trifluoromethylvinyl-gona-4,8(14),9-trien-3-one-17β-cyclohexyl ether,
13-butyl-17α-chloroethynyl-gona-4,8(14),9-trien-3-one-17β-cyclohexyl ether,
13-butyl-17α-bromoethynyl-gona-4,8(14),9-trien-3-one-17β-cyclohexyl ether,
13-butyl-17α-trifluorovinyl-gona-4,8(14),9-trien-3-one-17β-cyclohexyl ether,
13-cyclohexyl-17α-trifluoromethylvinyl-gona-4,8(14),9-trien-3-one-17β-methyl ether,
13-cyclohexyl-17α-trifluoromethylvinyl-gona-4,8(14),9-trien-3-one-17β-methyl ether,
13-cyclohexyl-17α-gona-4,8(14),9-trien-3-one-17β-methyl ether,
13-cyclohexyl-17α-bromoethynyl-gona-4,8(14),9-trien-3-one-17β-methyl ether, and
13-cyclohexyl-17α-trifluorovinyl-gona-4,8(14),9-trien-3-one-17β-methyl ether,
13-ethyl-17α-trifluorovinyl-gona-4,8(14),9-trien-3-one-17β-allyl ether,
13-n-propyl-17α-trifluoromethylvinyl-gona-4,8(14),9-trien-3-one-17β-cyclohexenyl ether,
13-butyl-17α-trifluoromethylethynyl-gona-4,8(14),9-trien-3-one-17β-diethylamino ethyl ether,
13-cyclohexyl-17α-trifluoromethylvinyl-gona-4,8(14),9-trien-3-one-17β-pyrrolidyl ethyl ether and
13-ethyl-17α-trifluoromethylethynyl-gona-4,8(14),9-trien-3-one-17β-diethylamino ethyl ether,
13-cyclohexyl-17α-trifluoromethylvinyl-gona-4,8(14),9-trien-3-one-17β-pyrrolidyl ethyl ether and
13-ethyl-17α-trifluoromethylethynyl-gona-4,8(14),9-trien-3-one-17β-morpyholino propyl ether.

The compounds of this invention may be administered alone or associated with a pharmaceutical carrier, choice of which depends upon the properties of the active compound and standard pharmaceutical practice. Generally the compound is administered in dosages of the same order of magnitude as other progestational agents such as Norethisterone and dosage units may take the form of tablets, powders, capsules, elixirs, or syrups which are particularly useful for oral ingestion. Liquid diluents are employed as a condition for parenteral use.

The following examples are given by way of illustration only and are not intended as a limitation of this invention, many apparent variations of which are possible wthout departing from the intent and scope thereof.

EXAMPLE 1

This example illustrates the preparation of 6-oxo-1-vinyl-2,3,4,6,7,8-hexahydronaphthalene, which may also be designated as 1-vinyl-Δ¹(9),5(10)-hexalone-6, starting from 6-methoxy-α-tetralone.

*Step 1.—Preparation of 1,2,3,4-tetrahydro-6-methoxy-1-naphthol*

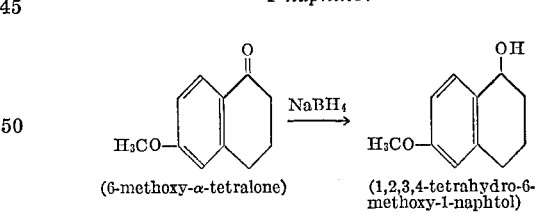

(6-methoxy-α-tetralone)    (1,2,3,4-tetrahydro-6-methoxy-1-naphtol)

Eight grams of 6-methoxy-α-tetralone, the synthesis of which has been reported by G. Stork in JACS, 69, 576 (1947), are dissolved in 320 ml. of methanol and cooled to 0° C. A freshly prepared solution of 8 g. NaBH₄ in 80 ml. of H₂O is added with stirring. The resulting solution is stirred for an additional 12 hours at room temperature, neutralized with NaH₂PO₄, and the methanol removed in vacuo. The residue is extracted with ether, washed with water, dried and concentrated to a heavy oil; yield=7.10 grams of 1,2,3,4-tetrahydro-6-methoxy-1-naphthol. The reaction of Step 1 may be represented by the above equation.

*Step 2.—Preparation of 6-oxo-1-vinyl-2,3,4,6,7,8-hexahydronaphthalene*

The 1,2,3,4-tetrahydro-6-methoxy-1-naphthol obtained from Step 1 is converted to 6-oxo-1-vinyl-2,3,4,6,7,8-hexahydronaphthalene substantially according to the process described in Izvest. Akad. Nauk SSSR-Otdel. Khim. Nauk, 1803 (1961). The conversion involves four steps which may be represented in flow chart form as follows:

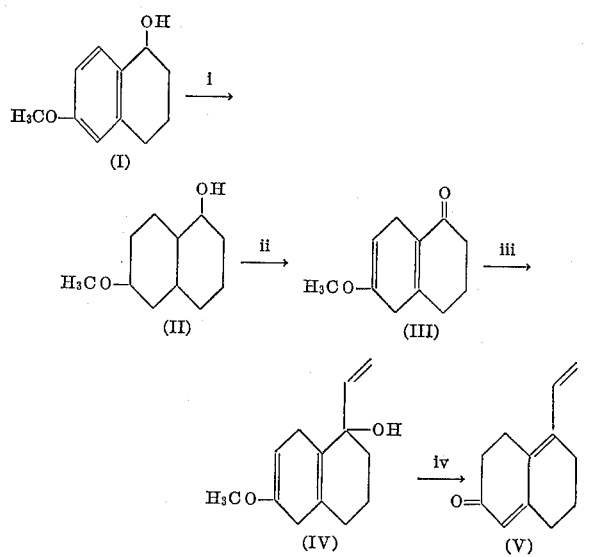

(i) *Reduction of 1,2,3,4-tetrahydro-6-methoxy-1-naphthol.*—6.54 grams of 1,2,3,4-tetrahydro-6-methoxy-1-naphthol (I), the reduction product obtained in Step 1, are dissolved in a mixture of 160 ml. tetrahydrofuran and 160 ml. tertiary-butanol, which is then added to a round bottom flask fitted with a reflux condenser and containing 10.3 g. sodium in 390 ml. liquid ammonia. The system is purged with nitrogen gas and the mixture refluxed for 4½ hours. The flask is then cooled, 25 ml. methanol are added and the ammonia is evaporated off. The residue is concentrated in vacuo and the 1,2,3,4,5,8-hexahydro-6-methoxy-1-naphthol (II) product, which is also known as 6-methoxy-$\Delta^{6,9}$-hexalol, is extracted by the conventional ether-water distribution technique. The ether layer is separated and the aqueous layer is further extracted with ether. The combined ether extracts are washed with water, dried over anhydrous $K_2CO_3$ and concentrated in vacuo to yield 6.40 grams of (II).

(ii) *Oxidation of 1,2,3,4,5,8-hexahydro-6-methoxy-1-naphthol.*—12 grams of aluminum isopropoxide and 6.40 grams of (II) are added to 28 ml. dry toluene under nitrogen and dissolved therein with slight heat. 16 ml. dry acetone are added and the mixture refluxed for 4½ hours. The mixture is then cooled, 12 ml. of water are added and the mixture is extracted four times with ether. The ether extracts are combined, dried over anhydrous $K_2CO_3$ and concentrated in vacuo to yield 6.00 g. of 3,4,5,8-tetrahydro-6-methoxy-1(2H)-naphthalenone (III), also known as 6-methoxy-5,8-dihydro-$\alpha$-tetralone.

(iii) *Preparation of vinylcarbinol.*—A freshly prepared solution of 16 g. vinyl bromide in 16 ml. tetrahydrofuran is added to 2.54 grams magnesium in 22 ml. tetrahydrofuran under a nitrogen atmosphere to prepare vinylmagnesium bromide (Grignard reagent). To this is added 5 grams of (III), dissolved in a mixture of 22 ml. ether and 6.3 ml. tetrahydrofuran. After 24 hours, the mixture is boiled for 1½ hours, cooled and poured into a mixture of 15 g. of ammonium chloride and 75 g. of ice. The organic layer is separated and the aqueous layer is extracted three times with ether. The extracted 1,2,3,4,5,8-hexahydro-6-methoxy-1-vinyl-1-naphthol (IV) need not be isolated before proceeding with the next step.

(iv) *Preparation of trieneone.*—The ether extracts of Step 2 (iii) are added to a mixture of 100 ml. of 2.5 N HCl and 20 g. of ice and stirred for 4 hours at room temperature under nitrogen. The ether layer is separated and the aqueous layer extracted with ether. The combined ether extracts are washed two times with aqueous $NaHCO_3$, two times with ice cold water, dried over $Na_2SO_4$ and concentrated in vacuo to yield 4.10 g. of 6-oxo-1-vinyl-2,3,4,6,7,8-hexahydronaphthalene (V), a yellow oil.

EXAMPLE 2

This example illustrates a method of preparing the cyclopentane-1,3-dione derivatives that are utilized in this invention. The method involves three steps, to wit, (1) the preparation of a triketoglyoxalate, (2) the preparation of a diketosemicarbazone, and (3) the preparation of a cyclopentanedione, as illustrated more specifically immediately hereinafter with the preparation of 2-methylcyclopentane-1,3-dione.

*Step 1.—Preparation of triketoglyoxalate*

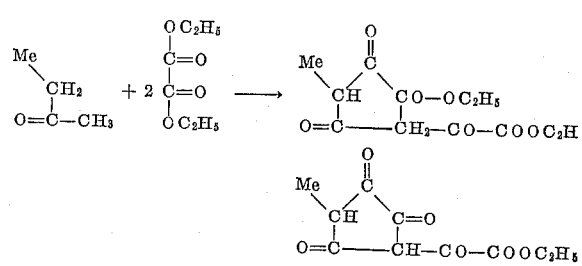

108 grams (2 moles) of fresh sodium methoxide are carefully dissolved in ice-cooled 580 ml. absolute alcohol and then cooled to 5° C. With stirring and continued cooling, a mixture of 72 g. (1 mole) of ethylmethylketone and 320 g. (2.2 moles) of diethyloxalate is added over a period of 30 minutes and then heated at 50° C. for 40 minutes. The mixture is cooled in an ice bath and, with strong stirring, a cold mixture of 55 ml. conc. $H_2SO_4$ and 55 ml. $H_2O$ is slowly added. After addition, the reaction mixture is allowed to come to room temperature and the salt filtered. The filtrate is concentrated in vacuo to about 200 ml. On cooling, a precipitate is obtained, which is recrystallized from ethyl acetate. The resulting crystalline product, 4-methyl-2,3,5-trioxo-cyclopentane glyoxylic acid ethyl ester, is filtered and dried; yield: 70 g.; M.P. 158–160°. The reaction of Step 1 may be represented by the above equation.

*Step 2.—Preparation of diketosemicarbazone*

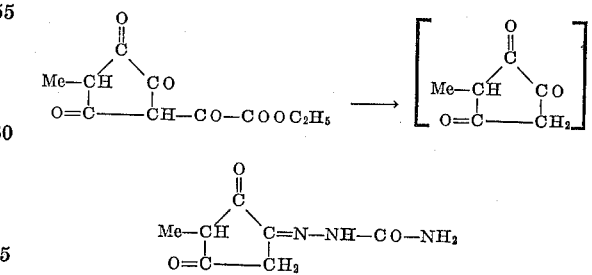

70 grams (0.31 mole) of the triketoglyoxalate obtained from Step 1 is suspended in 1050 ml. 2.5 N HCl and slowly heated with stirring to reflux. After refluxing for about 1 hour, the solution is cooled to room temperature and added to an equal volume of alcohol. At room temperature there is then added dropwise with stirring over a period of 1½ hours a solution of 53.5 g. (0.79 mole) of semicarbazide-HCl and 74 g. of Na-acetate in 490 ml.

H₂O. A precipitate of 3-methyl-2,4-cyclopentadione-1-semicarbazone is obtained; yield: 54 g. The material has no sharp melting point, decomposing around 290° C. The reaction of Step 2 may be represented by the above equation.

*Step 3.—Preparation of 2-methylcyclopentane-1,3-dione*

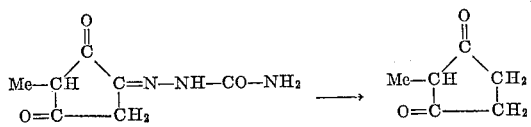

Fifty-four grams of KOH are dissolved with stirring in 540 ml. ethylene glycol and the solution heated to 130° C. Fifty-four grams of the semicarbazone obtained in Step 2 is then added gradually and with stirring and the mixture refluxed for 1½ hours. The mixture is then cooled and concentrated under a vacuum (0.5 mm.) to dryness. The residue is dissolved in water, ice-cooled and acidified to pH 3. A precipitate of 2-methylcyclopentane-1,3-dione is obtained which is filtered off and dried; yield: 27.4 g.; M.P.: 205–208° C. The reaction of Step 3 may be represented by the above equation.

EXAMPLE 3

The procedures of Example 2 are followed except that equivalent quantities of other ketones are utilized in place of the ethylmethyl ketone of Step 1 therein, thereby obtaining various derivatives of cyclopentane-1,3-dione. Accordingly, the use of other lower alkylmethyl ketones, such as propylmethylketone, isobutylmethyl ketone, n-butylmethyl ketone and amylmethyl ketone, yields the corresponding 2-lower alkylcyclopentane-1,3-dione compounds, such as 2-ethylcyclopentane-1,3-dione, 2-isopropyl-cyclopentane-1,3-dione, 2-n-propyl-cyclopentane-1,3-dione and 2-n-butyl-cyclopentane-1,3-dione, respectively. Similiarly, the use of 5 - keto - hexane-1-(CH₂=CH—CH₂—CH₂—CO—CH₃), and 1,1,1-trifluoro-3-butanone(CR₃—CH₂—CO—CH₃), in lieu of the ethyl methyl ketone of Step 1, yields 2-allyl cyclopentane-1,3-dione and 2-trifluoromethyl-cyclopentane-1,3-dione, respectively. In like manner, the use of etherified methyl ketones having the formula $$CH_3—CO—CH_2—CH_2OR''$$

wherein R″ is an alkyl radical preferably having from 1 to 5 carbon atoms, such as β-methoxyethyl methyl ketone, β-ethoxyethyl methyl ketone, β-propoxyethyl methyl ketone, β-butoxyethyl methyl ketone and β-amyloxyethyl methyl ketone, yields the corresponding 2-alkoxymethyl derivatives of cyclopentane-1,3-dione, such as 2-methoxymethyl-cyclopentane-1,3-dione, 2-ethoxymethyl-cyclopentane-1,3-dione, 2-propoxymethyl-cyclopentane-1,3-dione, 2-butoxymethyl-cyclopentane-1,3-dione and 2-amyloxymethyl-cyclopentane-1,3-dione, respectively.

pentane-1,3-dione are dissolved in a mixture of tetrahydrofuran and tertiary butanol followed by the addition of 10 g. of potassium-t-butoxide. The mixture is cooled to 0° C. and a stream of CHClF₂ is passed into the mixture for 5 hours with constant cooling. The reaction product is poured onto excess ice water and acidified to pH 2.5 followed by repeated chloroform extractions. The chloroform extracts are combined, washed with a small amount of ice water, dried and concentrated in vacuo to yield 6.2 g. of 2-difluoromethyl-cyclopentane-1,3-dione.

EXAMPLE 5

This example illustrates the preparation of 13-methyl-gona-4,8(14),9-triene-3,17-dione from the interaction of 6-oxo-1-vinyl-2,3,4,6,7,8-hexahydronaphthalene and 2-methylcyclopentane-1,3-dione. The reaction may be represented as follows:

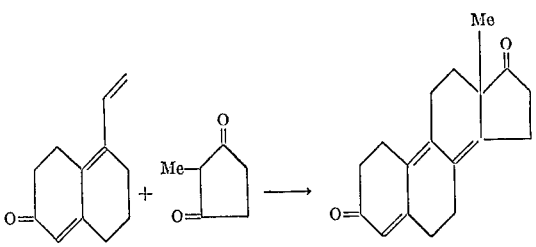

6.50 grams of 6-oxo-1-vinyl-2,3,4,6,7,8-hexahydronaphthalene are dissolved in a mixture of dry xylene (27 ml.) and tertiary-butanol (13.5 ml.) and to this are added 4.05 g. of 2-methyl-cyclopentane-1,3-dione and 1.81 ml. diethylamine. The resulting mixture is refluxed for 40 hours and then concentrated in vacuo. The residue is dissolved in methylene chloride, washed successively with aqueous NaHCO₃, dilute HCl and water, dried and concentrated in vacuo. The resulting concentrate is chromatographed on acid washed alumina and eluted with benzene-chloroform mixtures to yield 1.6 g. of 13-methyl-gona-4,8(14),9-triene-3,17-dione, M.P. 130–131° C. Analysis of the product found C=80.90%, H=7.60%; calculated C=80.56%, H=7.51%. U.V. adsorption data revealed: $\lambda_{max.}=3500$; $\epsilon=24,200$.

EXAMPLE 6

Using the same procedure as in Example 5, 6-oxo-1-vinyl-2,3,4,6,7,8-hexahydronaphthalene is reacted with the cyclopentane-1,3-dione derivatives listed in Table I to yield the corresponding gona-4,8,(14),9-triene-3,17-dione compounds.

TABLE I

| Cyclopentane-1,3-dione derivative: | Corresponding gona-4,8(14),9-triene-3,17-dione |
|---|---|
| 2-ethyl-cyclopentane-1,3-dione | 13-ethyl-gona-4,8(14),9-triene-3,17-dione. |
| 2-isopropyl-cyclopentane-1,3-dione | 13-isopropyl-gona-4,8(14),9-triene-3,17-dione. |
| 2-n-propyl-cyclopentane-1,3-dione | 13-n-propyl-gona-4,8(14),9-triene-3,17-dione. |
| 2-n-butyl-cyclopentane-1,3-dione | 13-n-butyl-gona-4,8(14),9-triene-3,17-dione. |
| 2-allyl-cyclopentane-1,3-dione | 13-allyl-gona-4,8(14),9-triene-3,17-dione. |
| 2-difluoromethyl-cyclopentane-1,3-dione | 13-difluoromethyl-gona-4,8(14),9-triene-3,17-dione. |
| 2-trifluoromethyl-cyclopentane-1,3-dione | 13-trifluoromethyl-gona-4,8(14),9-triene-3,17-dione. |
| 2-methoxymethyl-cyclopentane-1,3-dione | 13-methoxymethyl-gona-4,8(14),9-triene-3,17-dione. |
| 2-ethoxymethyl-cyclopentane-1,3-dione | 13-ethoxymethyl-gona-4,8(14),9-triene-3,17-dione. |
| 2-pentoxymethyl-cyclopentane-1,3-dione | 13-pentoxymethyl-gona-4,8(14)9-triene-3,17-dione. |

EXAMPLE 4

This example illustrates a method of preparing 2-difluoromethyl-cyclopentane-1,3-dione. Ten grams of cyclo- In accordance with the above procedures, gona-4,8(14),9-triene-3,17-dione is prepared from the interaction of 6-oxo-1-vinyl-2,3,4,6,7,8-hexahydronaphthalene and cyclopentane-1,3-dione.

This example illustrates the preparation of 13-R-gona-4,8(14),9-triene-3,17-dione wherein R is a hydrogen atom or a lower alkyl, allyl, difluoromethyl, trifluoromethyl and alkoxymethyl radical.

EXAMPLE 7

This example illustrates the preparation of 13-methyl-17α-chloroethynyl - 17 - hydroxygona-4,8(14),9-triene-3-one. The reaction may be represented as follows:

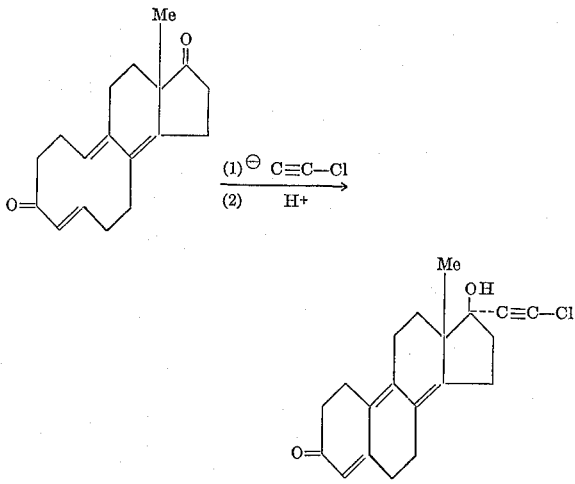

A solution of 0.144 ml. cis-dichloroethylene in 0.45 ml. dry ether is added to a solution of sodamide in 4.5 ml. liquid ammonia (prepared from 105 mg. sodium), thereby forming the chloroacetylide carbanion in situ, and the resulting mixture is refluxed (circa −30° C.) for 30 minutes. To this is added a solution of 300 mg. of the 13-methyl-gona-4,8(14),9-triene-3,17-dione obtained from Example 5 in 3 ml. dry tetrahydrofuran and refluxing (circa −30° C.) is continued for 1½ hours. After cooling to room temperature, the product is poured onto a mixture of $NH_4Cl$ and ice, extracted with ether and the ether extract washed with dilute HCl, aqueous $NaHCO_3$, water and then dried. The extract is then chromatographed on acid-washed alumina and eluted with benzene-chloroform mixtures to yield 150 mg. of 13-methyl-17α-chloroethynyl-17-hydroxygona - 4,8(14),9-triene-3-one, M.P.: 159–160° C. Analysis of the product found C=72.97%, H=6.45%; calculated C=72.98%, H=6.39%. U.V. absorption data revealed: $\lambda_{max}$=3575, $\epsilon$=19,850.

EXAMPLE 8

Using the same procedure as in Example 7, cis-dichloroethylene is reacted with the gona-4,8(14),9-triene-3,17-dione compounds listed in Table I of Example 6 to yield, respectively, the corresponding 17α-chloroethynyl-17-hydroxygona-4,8(14),9-triene-3-one compounds tabulated in Table II.

TABLE II 13-ethyl-17α-chloroethynyl-17-hydroxygona-4,8(14),9-triene-3-one 13-isopropyl-17α-chloroethynyl-17-hydroxygona-4,8(14),9-triene-3-one 13-n-propyl-17α-chloroethynyl-17-hydroxygona-4,8(14),9-triene-3-one 13-n-butyl-17α-chloroethynyl-17-hydroxygona-4,8(14),9-triene-3-one 13-allyl-17α-chloroethynyl-17-hydroxygona-4,8(14),9-triene-3-one 13-difluoromethyl-17α-chloroethynyl-17-hydroxygona-4,8(14),9-triene-3-one 13-trifluoromethyl-17α-chloroethynyl-17-hydroxygona-4,8(14),9-triene-3-one 13-methoxymethyl-17α-chloroethynyl-17-hydroxygona-4,8(14),9-triene-3-one 13-ethoxymethyl-17α-chloroethynyl-17-hydroxygona-4,8(14),9-triene-3-one 13-pentoxymethyl-17α-chloroethynyl-17-hydroxygona-4,8(14), 9-triene-3-one In accordance with the above procedures, cis-dichloroethylene is reacted with gona-4,8(14),9-triene-3,17-dione to yield the corresponding 17α-chloroethynyl-17-hydroxygona-4,8(14),9-trien-3-one.

In accordance with the above procedures, but utilizing cis-dibromomethylene in lieu of the cis-dichloroethylene, the corresponding 17α-bromoethynyl derivatives of 13-R-17-hydroxygona-4,8(14),9-trien-3-one are prepared.

This example illustrates the preparation of 13-R-17α-haloethynyl-17-hydroxygona-4,8(14),9-trien-3-one wherein R is a hydrogen atom or a lower alkyl, allyl, difluoromethyl, trifluoromethyl and alkoxymethyl radical.

EXAMPLE 9

30-milliliters of liquid ammonia is charged into a 3-neck flask which has been cooled in Dry Ice and fitted with a stirrer, an inlet tube and an outlet tube. 2 grams of metallic potassium in small pieces are added and acetylene is introduced until the blue color is discharged, indicating the formation of potassium acetylide. A solution of 2.5 g. of 13-n-propyl-gona-4,8(14),9-triene-3-17-dione in 15 ml. of ether and 15 ml. of benzene is added with stirring at a temperature of −60° to −70° C. Acetylene is then bubbled through the slurry for 3 hours. The Dry Ice bath is removed and the ammonia is allowed to evaporate overnight. The residue is diluted with water, filtered and the filtrate extracted with benzene. The benzene extract is dried, concentrated in vacuo, chromatographed on silica gel and eluted with ether-petroleum ether mixtures to yield 13-n-propyl-17α-ethynyl-17-hydroxy-gona-4,8(14),9-trien-3-one. The reaction may be illustrated as follows:

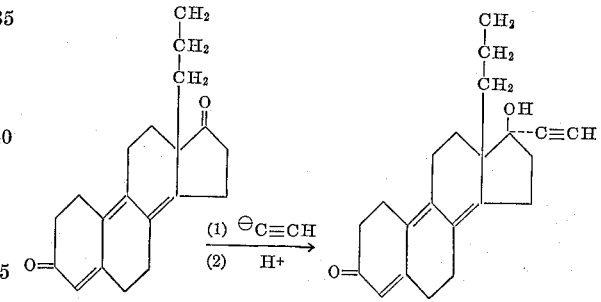

In accordance with the above procedures, but starting with the 13-methyl, 13-ethyl, 13-isopropyl and 13-butyl derivatives of gona-4,8(14),9-triene-3,17-dione in lieu of 13-n-propyl-gona-4,8(14),9-triene-3,17-dione, the corresponding 13-methyl, 13-ethyl, 13-isopropyl and 13-butyl derivatives of 17α-ethynyl-17-hydroxygona - 4,8(14),9-trien-3-one are respectively obtained.

The foregoing example illustrates a method of preparing the 17α-ethynyl derivatives of 13-alkyl-17-hydroxygona-4,8(14),9-trien-3-one, which may be represented by the following formula:

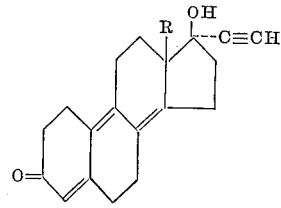

wherein R is preferably an alkyl radical having from 1 to 5 carbon atoms.

EXAMPLE 10

Using the same procedure as in Example 9, acetylene is reacted with the 13-hydro, 13-allyl, 13-difluoromethyl, 13-trifluoromethyl and 13-alkoxymethyl derivatives of gona-4,8(14),9-triene-3,17-dione to yield, respectively, the corresponding 13-hydro, 13-allyl, 13-difluoromethyl, 13-trifluoromethyl and 13-alkoxymethyl derivatives of 17α-ethynyl-17-hydroxygona-4,8(14),9-triene-3-one.

EXAMPLE 11

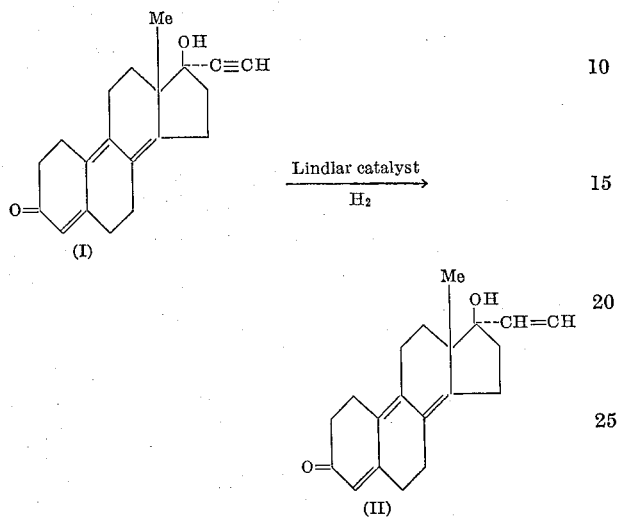

A solution of 200 mg. of 13-methyl-17α-ethynyl-17-hydroxygona-4,8(14),9-trien-3-one (I) in 10 ml. of ethylacetate is reduced with hydrogen in the presence of 25 mg. of Lindlar catalyst (lead deactivated palladium on a calcium carbonate support) at atmospheric pressure until one stoichiometric equivalent of hydrogen has been taken up. The product is filtered and the filtrate concentrated in vacuo. The concentrate is chromatographed on silica gel and eluted with ether-petroleum ether mixtures to yield 13-methyl - 17α - vinyl-17-hydroxygona-4,8(14),9-trien-3-one (II).

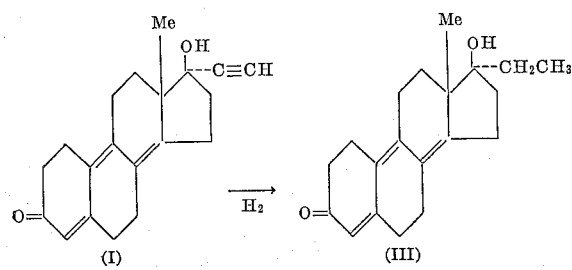

A solution of 200 mg. of (I) in 10 ml. of dioxane is reduced with hydrogen in the presence of 25 mg. of palladium on barium carbonate at atmospheric pressure until two stoichiometric equivalents of hydrogen have been taken up. The product is filtered, and the filtrate concentrated in vacuo and chromatographed on silica gel. Elution with ether-petroleum ether mixtures yields 13-methyl-17α-ethyl-17-hydroxygona-4,8(14),9-trien-3-one (III).

The foregoing example illustrates a method of preparing the 17α-vinyl and 17α-ethyl derivatives of the novel 17-hydroxygona,4,8(14),9-trien-3-one compounds of this invention by the reduction of the corresponding 17α-ethynyl-17-hydroxygona-4,8(14),9-trien-3-ones. Using the same procedure, the 13-hydro, 13-difluloromethyl, 13-trifluoromethyl and 13-alkoxymethyl derivatives of 17α-ethynyl-17-hydroxygona-4,8(14),9-trien-3one are reduced to the corresponding 17α-vinyl and 17α-ethyl compounds.

EXAMPLE 12

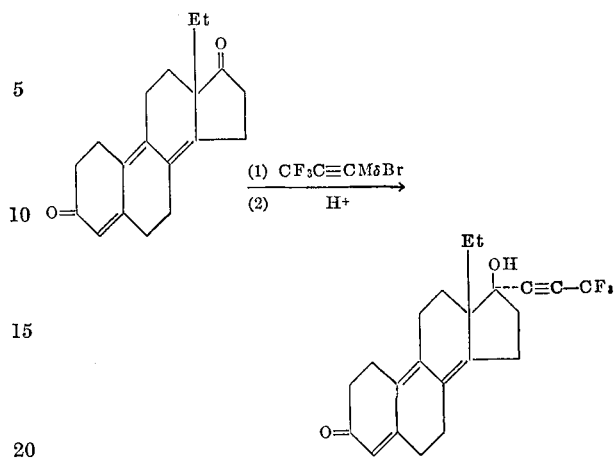

A 50 ml. round bottom flask is fitted with a Dry Ice condenser, a dropping funnel and a magnetic stirrer. After the addition of 210 mg. of metallic magnesium, the entire system is purged with nitrogen gas and flame dried. 5 ml. of dry ether is then added, followed by the dropwise addition, with stirring, of 1 ml. of ethyl bromide in 5 ml. of ether. After all the magnesium has reacted with the ethyl bromide, 5 ml. of trifluoropropyne (prepared by the reaction of propiolic acid with sulfur tetrafluoride) is distilled into the reaction flask and the mixture refluxed under Dry Ice acetone for one hour. The Dry Ice acetone condenser is then removed, the reaction allowed to warm to room temperature and the excess gaseous trifluoropropyne distilled off. A solution of 1.0 g. of 13-ethyl-gona-4,8(14), 9-triene-3,17-dione (I) in 5 ml. of benzene and 5 ml. of ether is added and the mixture stirred for 16 hours at room temperature. Water is then added and the mixture extracted with ether. The ether extracts are washed with water until the washings are weakly basic, dried over sodium sulfate and concentrated in vacuo. The residue is chromatographed on silica gel and eluted with ether-petroleum ether mixtures to yield 13-ethyl-17α-trifluoromethylethynyl-17-hydroxy-gona - 4,8(14),9 - trien-3-one (II).

In accordance with the above procedures, but starting with the 13-methyl, 13-isopropyl, 13-n-propyl, 13-butyl, 13-hydro, 13-allyl, 13-difluoromethyl, 13-trifluoromethyl and 13-alkoxymethyl derivatives of gona-4,8(14),9-triene-3,17-dione in place of (I), the corresponding 13-methyl, 13-isopropyl, 13-n-propyl, 13-butyl, 13-hydro, 13-allyl, 13-difluoromethyl, 13-trifluoromethyl and 13-alkoxymethyl derivatives of 17α-trifluoromethylethynyl-17-hydroxygona-4,8(14),9-trien-3-one, respectively, are obtained.

EXAMPLE 13

This example illustrates a method of preparing the novel 13-R-17α-hydro-17-hydroxygona - 3,8(14),9 - trien-3-one steroids of this invention by the reduction of the corresponding 13-R-gona-3,8(14),9-triene-3,17-dione. Exemplifying the preparation of the 13-methyl-derivative, the reaction may be illustrated as follows:

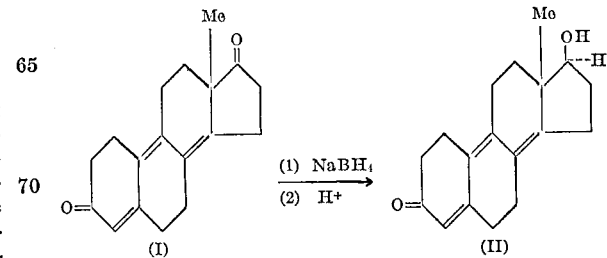

A solution of 100 mg. of 13-methyl-gona-4,8(14),9-triene-3,17-dione (I) in 20 ml. methanol is treated with 20 mg. sodium borohydride for 1 hour at 0° C. A few drops of acetic acid are added and the solution is concentrated to dryness. The residue is extracted with benzene and concentrated in vacuo, followed by chromatography on silica gel and elution with ether-petroleum ether mixtures to yield 13-methyl-17α-hydro-17-hydroxygona-4,8(14),9-trien-3-one (II).

In accordance with the above procedures, the reduction of the 13-ethyl, 13-isopropyl, 13-n-propyl, 13-butyl, 13-hydro, 13-allyl, 13-difluoromethyl, 13-trifluoromethyl and 13-alkoxymethyl derivatives of gona-4,8(14),9-triene-3,17-dione yields, respectively, the corresponding 13-ethyl, 13-isopropyl, 13-n-propyl, 13-butyl, 13-hydro, 13-allyl, 13-difluoromethyl, 13- trifluoromethyl and 13-alkoxymethyl derivatives of 17α-hydro-17-hydroxygona-4,8(14),9-trien-3-one.

EXAMPLE 14

This example illustrates a method of preparing the novel 17α-methyl-17-hydroxygona-4,8(14),9-trien-3-one steroids of this invention by the Grignard methylation of the corresponding gona-4,8(14),9-triene-3,17-diones. Exemplifying the preparation of the 13-methyl derivatives, the reaction may be represented by the following equation:

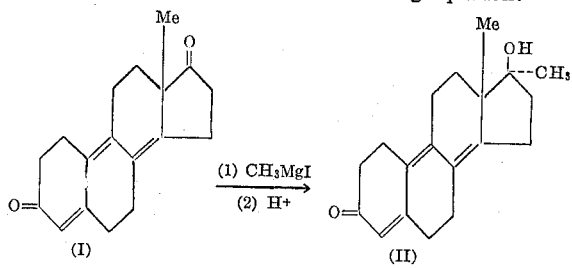

A solution of 300 mg. of 13-methyl-gona-4,8(14),9-triene-3,17-dione (I) in 20 cc. of ether is treated with 1.4 ml. of 1 N methylmagnesium iodide in ether and the mixture is stirred for 1 hour at room temperature. The mixture is then diluted with water, and the resulting product (II) is taken up in ether, dried and concentrated in vacuo. Chromatography over silica gel and elution with ether-petroleum ether mixtures yields 13-methyl-17α-methyl-17-hydroxygona-4,8(14),9-trien-3-one (II).

In accordance with the above procedure, but substituting equivalent quantities of the respective gona-4,8(14),9-triene-3,17-diones of Example 6 for the 13-methyl-gona-4,8(14),9-triene-2,17-dione above, there is obtained as products the corresponding 13-R-17α-methyl-17-hydroxygona-4,8(14),9-trien-3-ones.

EXAMPLE 15

Using the same procedures as in Example 14, but substituting an allylmagnesium halide for the Grignard reagent therein, there are obtained as products the corresponding 13-R-17α-allyl-17-hydroxygona-4,8(14),9-trien-3-one steroids which may be represented by the following formula:

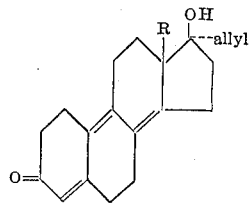

wherein R is a hydrogen atom and a lower alkyl, allyl, difluoromethyl, trifluoromethyl and alkoxymethyl radical.

EXAMPLE 16

Using the same procedures as in Example 14, but substituting a methallylmagnesium halide for the Grignard reagent therein, there are obtained as products the corresponding 13-R-17α-methylallyl-17-hydroxygona-4,8(14), 9-trien-3-one steroids which may be represented by the following formula:

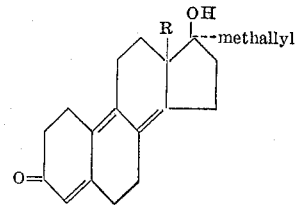

wherein R is a hydrogen atom and a lower alkyl, allyl, difluoromethyl, trifluoromethyl and alkoxymethyl radical.

EXAMPLE 17

Using the same procedures as in Example 14, but substituting a vinylmagnesium halide for the Grignard reagent therein, there are obtained as products the corresponding 13-R-17α-vinyl-17-hydroxygona-4,8(14),9-trien-3-one steroids which may be represented by the following formula:

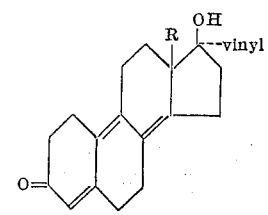

wherein R is a hydrogen atom and a lower alkyl, allyl, difluoromethyl, trifluoromethyl and alkoxymethyl radical.

EXAMPLE 18

Using the same procedure as in Example 14, but substituting an ethynylmagnesium halide for the Grignard reagent therein, there are obtained as products the corresponding 13-R-17α-ethynyl-17-hydroxy-gona-4,8(14),9-trien-3-one which may be represented by the following formula:

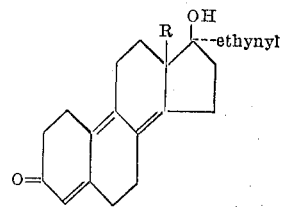

wherein R is a hydrogen atom and a lower alkyl, allyl, difluoromethyl, trifluoromethyl and alkoxymethyl radicals.

EXAMPLE 19

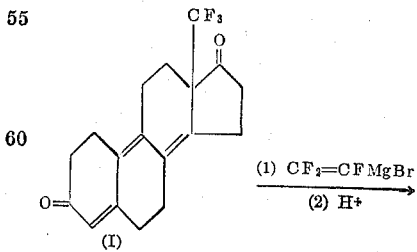

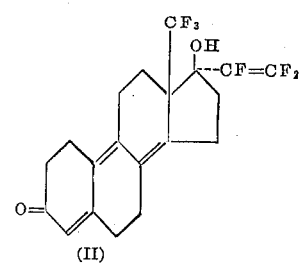

A solution of 300 mg. of 13-trifluoromethyl-gona-4,8(14),9-triene-3-17-dione (I) in 20 ml. of tetrahydrofuran is treated with 1.4 ml. of a 1N solution of trifluorovinylmagnesium bromide in tetrahydrofuran. The solution is stirred at room temperature for 3 hours and then diluted with water. The product (II) is extracted with ether and chromatographed on silica gel. Elution with ether-petroleum ether mixtures yields 13-trifluoromethyl-17α-triflourovinyl-17-hydroxygona-4,8(14),9-trien-3-one (II).

In accordance with the above procedure, but substituting equivalent quantities of the other 13-R-gona-4,8(14),9-triene-3,17-diones of Example 6 for the 13-triflouromethyl compound above, there are obtained as products the corresponding 13-R-17α-triflourovinyl-17-hydroxygona-4,8(14),9-trien-3-ones.

The foregoing example illustrates a method of preparing the novel 17α-trifluorovinyl-17-hydroxygona-4,8(14),9-trien-3-ones of this invention. In general terms, the process involves the interaction of the corresponding 13-R-gona-4,8(14),9-triene-3,17-dione compound with trifluorovinylmagnesium bromide, a Grignard reagent, according to the following equation:

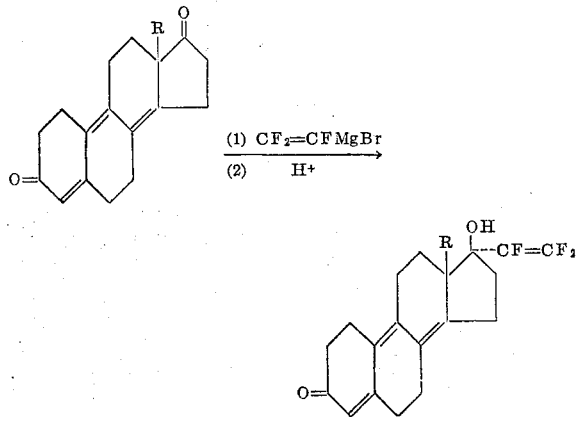

EXAMPLE 20

This example illustrates a method of preparing the novel 17α-alkyl-17-hydroxygona-4,8(14),9-trien-3-one steroids of this invention using alkyllithium as the 17-keto additive. Exemplifying the preparation of the 13-methyl-17α-ether derivative, the reaction may be represented by the following equation:

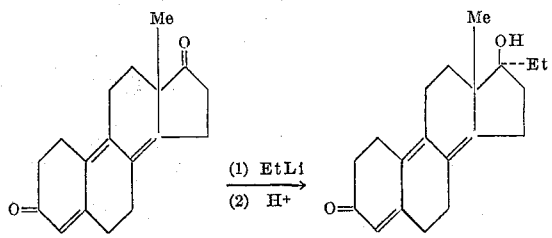

A solution of 300 mg. of 13-methyl-gona-4,8(14),9-triene-3,17-dione in 20 cc. of ether is treated with 1.4 ml. of 1N ethyllithium in ether and the mixture is stirred for 1 hour at room temperature. The mixture is then diluted with water, and the resulting product is taken up in ether, dried and concentrated in vacuo. Chromatography over silica gel and elution with ether-petroleum ether mixtures yields 13-methyl-17α-ethyl-17-hydroxygona-4,8(14),9-trien-3-one.

In accordance with the foregoing procedure, but substituting equivalent quantities of methyllithium,, propyllithium and butyllithium for the ethyllithium above, there are obtained as products the corresponding 17α-methyl, 17α-propyl and 17α-butyl derivatives, respectively.

In accordance with the foregoing procedures, but substituting equivalent quantities of the gona-4,8(14),9-triene-3,17-diones of Example 6 for the 13-methyl-gona-4,8(14),9-triene,-3,17-dione used above, there are obtained as products the corresponding 17α-alkyl-17-hydroxygona-4,8(14),9-trien-3-ones.

EXAMPLE 21

This example illustrates a method of converting the instant 13-R-17α-R′-17-hydroxygona-4,8(14),9-trien-3-ones to the corresponding 17β-alkanoyl ester derivatives thereof.

One-hundred mg. of 13-methyl-17α-chloroethynyl-17-hydroxygona-4,8(14),9-trien-3-one are heated with 1 cc. of acetic anhydride and 1.2 cc. of pyridine on a steam bath overnight. The reaction mixture is then poured onto ice and extracted with chloroform. The extract is washed with water and concentrated. The concentrate is chromatographed over acid-washed alumina and eluted with mixtures of ether and petroleum ether to give 13-methyl-17α-chloroethynyl-17β-acetoxygona-4,8(14),9-trien-3-one.

EXAMPLE 22

A mixture of 500 mg. of 13-methyl-17α-chloroethynyl-17β-hydroxygona-4,8(14),9-trien-3-one, 10 ml. of dimethyl formamide, 20 ml. of methyl iodide, and 1.5 grams of silver oxide are stirred at room temperature for 4 days, an additional ½ gram of silver oxide being added at the end of each day. 100 ml. of chloroform is then added to the reaction mixture and the mixture is stirred for one hour and filtered. The filtrate is evaporated to dryness and the residual oil is chromatographed over acid washed alumina and eluted with mixtures of ether and petroleum ether to give 13-methyl-17α-chloroethynyl-gona-4,8(14),9-trien-3-one-17β-methyl ether.

In accordance with the above procedure but starting with 13-methyl-17α-bromoethynyl - 17β - hydroxygona-4,8(14),9 - trien-3-one, 13-methyl-17α-trifluorovinyl-17β-hydroxygona - 4,8(14),9 - trien-3-one, 13-methyl-17α-trifluoromethylvinyl-17β-hydroxygona - 4,8(14),9 - trien-3-one, 13-methyl-17α-trifluoromethylethynyl-17β-hydroxygona - 4,8(14),9-trien-3-one, 13-methyl-17α-ethynyl-17β-hydroxygona-4,8(14),9-trien-3-one and the 13-ethyl, 13-propyl, 13-butyl, 13-allyl, 13-difluoromethyl and 13-trifluoromethyl analogs thereof in place of 13-methyl-17α-chloroethynyl-17β-hydroxygona - 4,8(14),9 - trien-3-one, there are obtained the corresponding 13-alkyl, 13-alkenyl, and 13-haloalkyl-17β-methoxygona - 4,8(14),9 - trien-3-ones.

In accordance with the above procedure but starting with any of the above 13-alkyl, 13-alkenyl and 13-cycloalkyl steroids and using ethyl, propyl, butyl, amyl, hexyl, cyclopentyl, cyclohexyl, allyl, cyclohexenyl, diethylamino ethyl, pyrrolidyl ethyl, morpholino ethyl, and benzyl iodide or bromide in place of methyl iodide there are obtained the corresponding 13-alkyl, 13-alkenyl, or 13-haloalkyl-17β-ethoxy, 17β-propoxy, 17β-butoxy, 17β-amoxy, 17β-cyclopentoxy, 17β-cyclohexoxy, 17β-allyloxy, 17β-cyclohexenoxy, 17β-diethylamino ethoxy, 17β-pyrrolidyl ethoxy, 17β-morpholino ethoxy and 17β-benzyloxy-gona-4,8(14),9-trien-3-ones.

EXAMPLE 23

To a mixture of 710 milligrams of 13-ethyl-17α-trifluorovinyl-17β-hydroxygona - 4,8(14),9-trien-3-one- and 20 ml. n-propyl iodide in 100 milliliters of benzene are added a suspension of 50 milligrams of sodium hydride in 20 milliliters of benzene and the mixture stirred at about 20° C. for 2 days under a nitrogen atmosphere. 100 milliliters of water are then added to the mixture which is then stirred for a further hour. The organic layer is separated and the water layer extracted with benzene. The combined benzene extracts are then dried over anhydrous potassium carbonate, filtered, and evaporated under reduced pressure. The residue is then chromatographed over acid washed alumina and eluted with mixtures of ether and petroleum ether to give 13-ethyl-17α-trifluorovinyl-gona-4,8(14),9-trien-3-one-17β-n-propyl ether.

In accordance with the above procedure but starting with 13-methyl-17α-trifluoromethylethynyl-17β-hydroxygona-4,8(14),9-trien-3-one, 13-ethyl-17α-trifluoromethylvinyl-17β-hydroxygona - 4,8(14),9-trien-3-one, 13-ethyl-17α-chloroethynyl-17β-hydroxygona - 4,8(14),9 - trien-3-one, 13-ethyl - 17α - bromo-ethynyl - 17β - hydroxygona-4,8(14),9-trien-3-one, 13-ethyl-17α-ethynyl-17β-hydroxygona-4,8(14),9-trien-3-one and the 13-methyl, 13-propyl, 13-butyl, 13-allyl, 13-trifluoromethyl and 13-difluoromethyl analogs thereof, in place of 13-ethyl-17α-trifluorovinyl-17β-hydroxygona-4,8(14),9-trien-3-one, there are obtained the corresponding 13-alkyl, 13-alkenyl, and 13-haloalkyl-17β-n-propoxy-gona-4,8(14),9-trien-3-ones.

In accordance with the above procedure but starting with any of the above 13-alkyl, 13-alkenyl, and 13-haloalkyl steroids and using methyl, ethyl, butyl, amyl, hexyl, cyclopentyl and cyclohexyl, allyl, cyclohexenyl, diethylamino ethyl, pyrrolidyl ethyl, morpholino ethyl, and benzyl iodide or bromide in place of n-propyl iodide there are obtained the corresponding 13-alkyl, 13-alkenyl, or 13-haloalkyl-17β-methoxy, 17β-ethoxy, 17β-butoxy, 17β-amoxy, 17β-hexoxy, 17β-cyclopentoxy, 17β-cyclohexoxy, 17β-allyloxy, 17β-cyclohexenoxy, 17β-diethylamino ethoxy, 17β-pyrrolidyl ethoxy, 17β-morpholino ethoxy, and 17β-benzyloxy-gona-4,8(14),9-trien-3-ones.

EXAMPLE 24

To a solution of 744 mg. of 13-butyl-17α-bromoethynyl-17β-hydroxygona-4,8(14),9-trien-3-one in 30 ml. of tetrahydrofuran is added a solution containing 2 g. of phenyllithium. The mixture is then stirred for 2 hours at 20° C. under nitrogen. A solution of 5 mg. of cyclohexyl iodide in 10 ml. of tetrahydrofuran is then added and the mixture stirred under nitrogen at 20° C. for a further 18 hours. The reaction mixture is then decomposed by the addition of a saturated aqueous solution of sodium chloride. The mixture is then thoroughly extracted with benzene and the organic extract dried over sodium sulfate, filtered, and evaporated under reduced pressure. The residue is then chromatographed over acid washed alumina and eluted with a mixture of ether and petroleum ether to give 13-butyl-17α-bromoethynyl-gona - 4,8(14),9-trien-3-one-17β-cyclohexyl ether.

In accordance with the above procedure but starting with 13-butyl-17α-trifluoromethylethynyl - 17β - hydroxygona-4,8(14),9-trien-3-one, 13-butyl-17α-trifluoromethylvinyl-17β-hydroxygona - 4,8(14),9-trien-3-one, 13-butyl-17α-trifluorovinyl-17β-hydroxygona - 4,8(14),9 - trien-3-one, 13-butyl - 17α - chloroethynyl - 17β - hydroxygona-4,8(14),9-trien-3-one and 13-butyl-17α-ethynyl-17β-hydroxygona-4,8(14),9-trien-3-one and the 13-methyl, 13-ethyl, 13-propyl, 13-allyl, 13-trifluoromethyl and 13-difluoromethyl analogs thereof in place of 13-butyl-17α-bromoethynyl-17β-hydroxygona - 4,8(14),9 - trien-3-one, there are obtained the corresponding 13-alkyl, 13-alkenyl, and 13-haloalkyl-17β-cyclohexoxygona-4,8(14),9-trien-3-ones.

In accordance with the above procedure but starting with any of the above 13-alkyl, 13-alkenyl, and 13-haloalkyl steroids and using methyl, ethyl, propyl, amyl, hexyl, butyl, cyclopentyl, allyl, cyclohexenyl, diethylamino ethyl, pyrrolidyl ethyl, morpholino ethyl, and benzyl iodide or bromide in place of cyclohexyl iodide there are obtained the corresponding 13-alkyl, 13-alkenyl, or 13-haloalkyl-17β-methoxy, 17β-ethoxy, 17β-propoxy, 17β-amoxy, 17β-hexoxy, 17β-butoxy, 17β-cyclopentoxy, 17β-allyloxy, 17β-cyclohexenoxy, 17β-diethylamino ethoxy, 17β-pyrrolidyl ethoxy, 17β-morpholino ethoxy and 17β-benzyloxy-gona-4,8(14),9-trien-3-ones.

EXAMPLE 25

To a mixture of 1 g. of dimethyl sulfate in 10 ml. of N-sodium hydroxide is added a solution of 734 mg. of 13 - allyl - 17α - trifluoromethylethynyl - 17β - hydroxygona-4,8(14),9-trien-3-one in 50 ml. of benzene. The mixture is then vigorously agitated for 18 hours at 20° C. At the end of this time, the mixture may have formed an emulsion which is then reconstituted into its constituent parts by the addition of a small amount of ethanol and solid sodium chloride. The organic layer is then separated and the aqueous layer thoroughly extracted with benzene. The organic extract is then dried over potassium carbonate, filtered and the solvent removed by evaporation under reduced pressure. The residue is then chromatographed over acid washed alumina and eluted with mixture of ether and petroleum ether to give 13-allyl-17α-trifluoromethylethynyl - gona - 4,8(14),9 - trien - 3 - one-17β-methyl ether.

In accordance with the above procedure but starting with 13-allyl-17α-trifluoromethylvinyl-17β-hydroxygona-4,8(14),9 - trien - 3 - one, 13 - allyl - chloroethynyl - 17β-hydroxygona - 4,8(14),9 - trien - 3 - one, 13 - allyl - 17α-bromoethylyl - 17β - hydroxygona - 4,8(14),9 - trien - 3-one, 13 - allyl - 17α - trifluorovinyl - 17β - hydroxygona-4,8(14),9-trien-3-one and 13-allyl-17α-ethynyl-17β-hydroxygona-4,8(14),9-trien-3-one and the 13-methyl, 13-ethyl, 13-propyl, 13-butyl, 13-trifluoromethyl and 13-difluoromethyl analogs thereof in place of 13-allyl-17α-trifluoromethylethynyl - 17β - hydroxygona-4,8(14),9-trien-3-one, there are obtained the corresponding 13-alkyl and 13 - haloalkyl - 17β - methoxygona - 4,8(14),9 - trien-3-ones.

In accordance with the above procedure but starting with any of the above 13-alkyl, 13-alkenyl, and 13-haloalkyl steroids and using diethyl, dipropyl, dibutyl, diamyl, dihexyl, dicyclopentyl, dicyclohexyl and dibenzyl sulfate in place of dimethyl sulfate there are obtained the corresponding 13-alkyl, 13-alkenyl, and 13-haloalkyl-17β-ethoxy, 17β-propoxy, 17β-butoxy, 17β-amoxy, 17β-hexoxy, 17β-cyclopentoxy, 17β-cyclohexoxy and 17β-benzyloxy-gona-4,8(14),9-trien-3-ones.

Various changes and modifications may be made in carrying out the present invention without departing from the spirit and scope thereof. Insofar as these changes and modifications are within the purview of the annexed claims, they are to be considered as part of our invention.

We claim:
1. 13 - alkyl - gona - 4,8(14),9(10)-trien - 3 - one-17α-substituted-17β-substituted amino alkyl ether wherein the alkyl moiety at C17β contains from 1 to 6 carbon atoms, and wherein the substituent at C17α is an unsaturated halogenated hydrocarbon group having from 2 to 3 carbon atoms.

2. 13 - alkyl - 17α - trifluoromethylvinyl - gona -4,8 (14),9(10)-trien-3-one-17β-substituted amino alkyl ether wherein the alkyl moiety at C17β contains from 1 to 6 carbon atoms.

3. 13 - methyl - 17α - ethynyl - gona - 4,8(14),9(10)-trien-3-one-17β-methyl ether.

4. 13 - methyl - 17α - chloroethynyl - gona - 4,8(14), 9(10)-trien-3-one-17β-methyl ether.

5. 13 - methyl - 17α - bromoethynyl - gona - 4,8(14), 9(10)-trien-3-one-17β-methyl ether.

6. 13 - methyl - 17α - chloroethynyl - gona - 4,8(14), 9(10)-trien-3-one-17β-cyclopentyl ether.

7. 13 - methyl - 17α - trifluoromethylethynyl - gona-4,8(14),9(10)-trien-3-one-17β-allyl ether.

8. 13 - methyl - 17α - trifluoromethylvinyl - gona-4,8(14),9(10)-trien-3-one-17β-diethylaminoethyl ether.

9. 13 - methyl - 17α - trifluorovinyl - gona - 4,8(14), 9(10)-trien-3-one-17β-pyrrolidylethyl ether.

10. 13 - ethyl - 17α-chloroethynyl - gona - 4,8(14), 9(10)-trien-3-one-17β-methyl ether.

11. 13 - ethyl - 17α - bromoethynyl - gona - 4,8(14), 9(10)-trien-3-one-17β-methyl ether.

12. 13 - ethyl - 17α - chloroethynyl - gona - 4,8(14), 9(10)-trien-3-one-17β-cyclopentyl ether.

13. 13 - butyl - 17α - chloroethynyl - gona - 4,8(14), 9(10)-trien-3-one-17β-allyl ether.

14. 13-butyl-17α-bromoethynyl-gona-4,8(14),9(10)-trien-3-one-17β-diethylaminoethyl ether.

15. 13-butyl-17α-chloroethynyl-gona-4,8(14),9(10)-trien-3-one-17β-cyclopentyl ether.

16. 13-propyl-17α-trifluoromethylethynyl-gona-4,8(14),9(10)-trien-3-one-17β-methyl ether.

17. 13-propyl-17α-trifluoromethylvinyl-gona-4,8(14),9(10)-trien-3-one-17β-n-allyl ether.

18. 13-propyl-17α-trifluorovinyl-gona-4,8(14),9(10)-trien-3-one-17β-diethylaminoethyl ether.

19. 13-allyl-17α-trifluoromethylethynyl-gona-4,8(14),9(10)-trien-3-one-17β-methyl ether.

20. 13-allyl-17α-trifluoromethylvinyl-gona-4,8(14),9(10)-trien-3-one-17β-cyclopentyl ether.

21. 13-allyl-17α-trifluorovinyl-gona-4,8(14),9(10)-trien-3-one-17β-pyrrolidylethyl ether.

22. 13-ethyl-17α-trifluorovinyl-gona-4,8(14),9(10)-trien-3-one-17β-allyl ether.

23. 13-propyl-17α-trifluorovinyl-gona-4,8(14),9(10)-trien-3-one-17β-pyrrolidyl ethyl ether.

References Cited
UNITED STATES PATENTS 3,242,197   3/1966   Windholz et al. ____ 260—397.3

ELBERT L. ROBERTS, *Acting Primary Examiner.*